United States Patent [19]

Krueger et al.

[11] 4,112,157
[45] Sep. 5, 1978

[54] METHOD OF PRODUCING A FILM WHICH PROMOTES HOMEOTROPIC ORIENTATION OF LIQUID CRYSTALS AND A LIQUID CRYSTAL UTILIZING THE FILM

[75] Inventors: Hans Krueger; Hans F. Mahlein; Walter Rauscher, all of Munich, Germany

[73] Assignee: Siemens Aktiengesellschaft, Berlin & Munich, Germany

[21] Appl. No.: 686,934

[22] Filed: May 17, 1976

Related U.S. Application Data

[63] Continuation of Ser. No. 479,847, Jun. 17, 1974, abandoned.

[30] Foreign Application Priority Data

Jun. 18, 1973 [DE] Fed. Rep. of Germany ....... 2330909

[51] Int. Cl.$^2$ ................................................ C09K 3/34
[52] U.S. Cl. ...................................... 428/1; 428/539; 427/166; 427/255; 350/340
[58] Field of Search ................. 350/160 LC; 427/166, 427/255; 428/1

[56] References Cited

U.S. PATENT DOCUMENTS

| 3,147,132 | 9/1964 | Geffcken | 427/166 |
| 3,585,381 | 6/1971 | Hodson | 250/47 |
| 3,834,792 | 9/1974 | Janning | 428/1 X |
| 3,971,869 | 7/1976 | Gelber et al. | 428/433 X |
| 4,022,934 | 5/1977 | Miller | 428/1 X |

OTHER PUBLICATIONS

Bush et al., Liq. Crystal Display Device, IBM Tech. Disc. Bull., vol. 14, No. 1, 6/1971, p. 223.

*Primary Examiner*—P. C. Ives
*Attorney, Agent, or Firm*—Hill, Gross, Simpson, Van Santen, Steadman, Chiara & Simpson

[57] ABSTRACT

A liquid crystal cell comprising a layer of liquid crystal material interposed between a pair of carrier plates with at least one plate being transparent characterized by a film of metal inorganic salt selected from a group comprising magnesium fluoride, thorium fluoride, zinc sulphide, aluminum oxide, or thorium oxide deposited on at least selected areas of a surface of one of the carrier plates to cause homeotropic orientation or a tilted homeotropic orientation of the molecules of the liquid crystal material contacting the film. To provide the film, the carrier plate is positioned in spaced relationship to a source of the salt which is vaporized and deposited on the plate in the desired areas to produce the column-like structure of the desired angular orientation.

9 Claims, No Drawings

METHOD OF PRODUCING A FILM WHICH PROMOTES HOMEOTROPIC ORIENTATION OF LIQUID CRYSTALS AND A LIQUID CRYSTAL UTILIZING THE FILM

This is a continuation of application Ser. No. 479,847, filed June 17, 1974 now abandoned.

BACKGROUND OF THE INVENTION

1. Field of the Invention

The present invention is directed to a liquid crystal cell having a film on a surface of at least one of the carrier plates which film promotes homeotropic or tilted homeotropic orientation of the liquid crystal molecules and to the method of producing the film on the surface of the carrier plates.

2. The Prior Art

Liquid crystal cells having a liquid crystal material such as a nematic material disposed in a layer between a pair of carrier plates at least one of which is transparent have been suggested for a display screen of a display device. If so called DAP effect (deformation of aligned phases) is being utilized in the liquid crystal display screen, an initial homeotropic orientation of the liquid crystal molecules is required. The homeotropic orientation is defined as the liquid crystal molecules being oriented perpendicularly to a plane of the surface of the carrier plate. Such an orientation is necessary in a liquid crystal device which is located between a pair of cross polarizers. In this arrangement, the linearly polarized light entering the liquid crystal film will experience no change in polarization direction and is, thus, consequently completely blocked by the second polarizer. When an electric field is applied to the liquid crystal film, the state of the liquid crystal molecules is changed as a function of the magnitude of the electric field and the polarization of the light entering the liquid crystal is changed or destroyed in relation to the magnitude of change of the orientation of the liquid crystal molecules so that light will pass the second polarizer. The amount of light or intensity of the light passing through the second polarizer is dependent on the magnitude of the electrical field applied to the cell.

To obtain a homeotropic orientation of the liquid crystal molecules, a film of orientation agent such as either lecithin, APAP (anisylidene-p-aminophenol) or PEBAP (p-ethoxy-benzylidene-p'-aminophenol) can be applied to a surface of the carrier plate which is being contacted by the liquid crystal material. A discussion of the application of this type of film is found in an article by Uchida et al, *Japanese Journal of Applied Physics*, Vol. 11, No. 10, 1972, pages 1559–1565. The orientation effect of these films is explained by the polar interaction between the specific orientation agent and the specific liquid crystal molecules. Thus, the liquid crystal must be matched to the particular orientation agent. The orientation agent or film will produce a change in the layer. The change which depends on the liquid crystal molecule and the particular orientation agent may be either an increased or decreased of the conductivity of the layer.

This type of orientation agent used for the film will decompose at high temperatures. Thus, when the liquid crystal cells are being sealed by the use of fused glass, problems occur with this type of agent.

If a surface of the carrier plate is provided with a structure of matrix-like pattern of grooves by a mechanical process, a homeotropic orientating effect is exerted on the molecules of the liquid crystal material. This orientating effect is discussed by D. W. Berreman, *Physical Review Letters*, Vol. 28, 1972, pages 1683–1686 and the discussion of this effect is with reference to the elastic continuum theory.

SUMMARY OF THE INVENTION

The present invention is directed to a liquid crystal cell having a metal inorganic salt film on at least one carrier plate to orient all of the liquid crystal molecules perpendicularly or obliquely to the film surface without requiring any secondary processing, and to a method of providing the film on the carrier plate. To accomplish the method, a source of the metal inorganic salts is provided, the salts are vaporized, the carrier plate is positioned relative to the source of the salts, with the surface being oriented at an angle to the path of the vaporizer salts and the vaporized salts are deposited as a film on the surface of the plate with the film having a column-like structure extending at an angle to the surface of the plate which angle is either perpendicular or obliquely oriented to the surface. The metal inorganic salt is preferably selected from a group consisting of magnesium fluoride, thorium fluoride, zinc sulphide, aluminum oxide, and thorium oxide.

DESCRIPTION OF THE PREFERRED EMBODIMENT

The principles of the present invention are utilized in providing a film having a column-like structure extending at an angle to a surface of the carrier plate on which the film is provided and which carrier plate is adapted for use in a liquid crystal display cell or display device. The liquid crystal cell may be of a conventional structure comprising a pair of carrier plates with at least one of the pair of plates being transparent. The pair of plates are positioned in a parallel spaced arrangement and a liquid crystal material is disposed in a thin layer between the pair of spaced plates and contacting the film of metal inorganic salt on at least one of the plates. The plates are provided with electrical conducting material to form electrodes for applying electrical voltage on the layer of material disposed therebetween.

The material of the film by the metal inorganic salt is preferably selected from a group consisting of magnesium fluoride, thorium fluoride, zinc sulphide, aluminum oxide, and thorium oxide. These materials are vaporized on the surface of the carrier plates so that their column-like structure is either normally or obliquely aligned to the plane of the surface of the plate on which the film is applied.

To obtain the orientation of the column-like structure of the film as it is being applied to the surface of the carrier plate, the surface of the plate is positioned relative to a vaporized source of the salt or material so that the corresponding direction or movement of the vapor during depositing on the surface is disposed perpendicularly to the surface of the carrier plate to produce a perpendicular column-like structure or is disposed obliquely to the surface of the plate to produce the obliquely disposed column-like structure. The particular orientation of the column-like structure of the film by interaction with the liquid crystal film or layer will produce either a homeotropic orientation of the molecules of the liquid crystal layer or a tilted homeotropic orientation. The orientation of the molecules of the liquid crystal layer is due to the polar interaction of the polar groups of the vaporized-on film of salt with the polar end groups of the liquid crystal molecules. The above-mentioned group of metal inorganic salts consisting of magnesium fluoride, thorium fluoride, zinc sulphide, aluminum oxide, and thorium oxide will produce an orientating effect on many of the known liquid crystal without causing any substantial change or influence on the original conductivity of the liquid crystal material.

An example of the method of applying a metal inorganic salt onto the carrier plate is as follows. Utilizing magnesium fluoride (MgF$_2$) as the salt, a source of the salt is provided in a crucible of tantalum located in a vacuum chamber of a vacuum vapor depositing device. The carrier plate is placed in the device at a distance of approximately 400 mm from the crucible. The crucible is raised to a temperature of about 1500° C by a resistance heating method and the MgF$_2$ vaporizes for about a minute at a pressure of a few $10^{-5}$ mm. Hg. The film of MgF$_2$, which is deposited upon the surface of the carrier plate, has a column-like structure oriented substantially perpendicular or normal to the surface of the carrier plate even at the edge surfaces of the plate.

In many instances, the film of material is only applied to predetermined locations of areas of the surface of the carrier plates. The distance between the surface to be provided with the film and the source or crucible of material is substantially large in comparison with the area to be covered so that the direction of movement of the vapor from the source to the surface is substantially parallel for all portions of the surface being coated. By controlling the orientation of the surface being coated relative to the direction of movement of the vaporized materials, the orientation or angular direction of column-like structure of the film relative to the surface of the plate can be controlled.

Although minor modifications might be suggested by those versed in the art, it should be understood that we wish to employ within the scope of the patent granted hereon, all such modifications as reasonably and properly come within the scope of our contribution to the art.

We claim:

1. In a liquid crystal cell having a thin layer of liquid crystal material interposed between a pair of spaced, parallel carrier plates with at least one of said plates being transparent, the improvement comprising a thin film of metal inorganic salt deposited on at least a portion of a surface of one of said plates and being in contact with the liquid crystal material, said thin film having a column-like structure extending at an angle to the surface of the plates so that the molecules of the liquid crystal material contacting the film assume a homeotropic orientation to the surface of the plate.

2. In a liquid crystal according to claim 1, wherein the metal inorganic salt is selected from a group consisting of magnesium fluoride, thorium fluoride, zinc sulphide, aluminum oxide, and thorium oxide.

3. A method of producing a film of metal inorganic salt on a surface of a carrier plate having an electrical conducting material to form electrodes on the surface, said film having a column-like structure extending substantially normal to the surface, said carrier plate being used in a liquid crystal cell comprising a layer of liquid crystal material interposed between a pair of parallel spaced carrier plates with the molecules of the layer of liquid crystal material which contacts the film having a homeotropic orientation relative to the surface of the carrier plate, said method comprising the steps of providing a source of the metal inorganic salt; positioning a carrier plate with the electrodes on the surface at a distance from the source of the salts which distance is substantially larger than the area of said surface to be provided with the film and with said surface facing the source and being oriented substantially normal to a line extending from said surface to the source; then vaporizing the metal inorganic salts; and depositing the vaporized salts on said surface as the film having a column-like structure extending substantially normal to the surface of the plate, so that the direction of movement of the vaporized salts being deposited on the surface is substantially parallel to said line and normal to said surface.

4. A method according to claim 3, wherein the step of depositing the vaporized salt on a surface of the carrier plate comprises depositing the film on predetermined areas of the surface.

5. A method according to claim 4, wherein the metal inorganic salt is selected from a group consisting of magnesium fluoride, thorium fluoride, zinc sulphide, aluminum oxide, and thorium oxide.

6. A method according to claim 3, wherein the metal inorganic salt is selected from a group consisting of magnesium fluoride, thorium fluoride, zinc sulphide, aluminum oxide, and thorium oxide.

7. A method according to claim 3, which further includes providing a vacuum chamber for receiving the source and the plate and creating a vacuum so that the steps of vaporizing and depositing occur in a vacuum.

8. A method of producing a film of a metal inorganic salt on a surface of a carrier plate for a liquid crystal cell, said metal inorganic salt being selected from a group consisting of magnesium fluoride, thorium fluoride, zinc sulphide, aluminum oxide and thorium oxide, said film having a column-like structure extending substantially normal to the surface of the plate so that molecules of a layer of liquid crystal material which contact the film will have a homeotropic orientation relative to the surface of the carrier plate, said method comprising the steps of providing a vacuum chamber; providing a source of the selected metal inorganic salt in the vacuum chamber; positioning the carrier plate in the vacuum chamber at a distance from said source which distance is substantially larger than the area of the surface to be provided with the film; orienting the surface of the plate to face the source and to be substantially normal to a line extending from the surface to said source; creating a vacuum in the chamber; then heating the source of a metal inorganic salt to vaporize the metal inorganic salt; and depositing the vaporized salts on said surface as a film with the direction of movement of the vaporized salt being deposited on each point of the surface being substantially parallel to said line so that the film of metal inorganic salt formed on the surface has a column-like structure extending substantially normal to the surface of the plate.

9. A method according to claim 8, wherein said metal inorganic salt is an electrical insulator.

* * * * *